Oct. 31, 1944.    V. H. PAVLECKA ET AL    2,361,706
STRUCTURAL JOINT
Filed Aug. 4, 1941    2 Sheets-Sheet 1
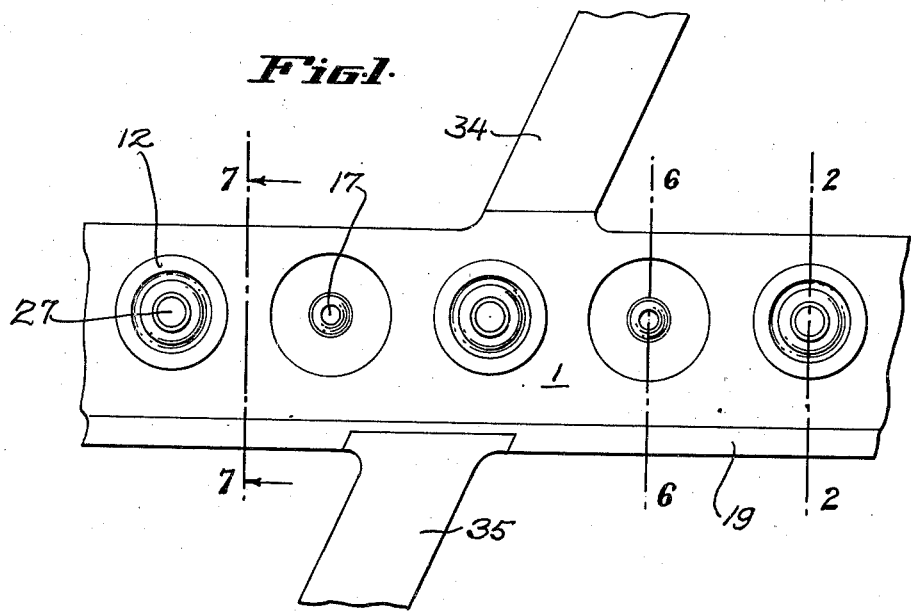
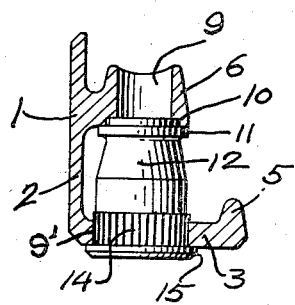
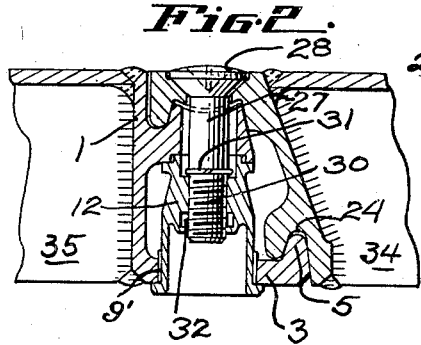
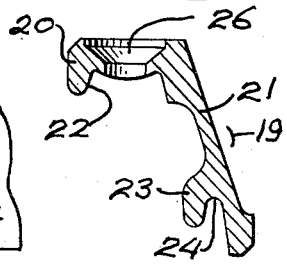
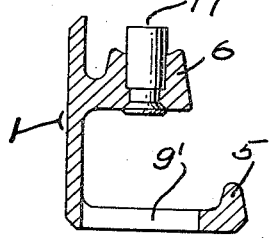
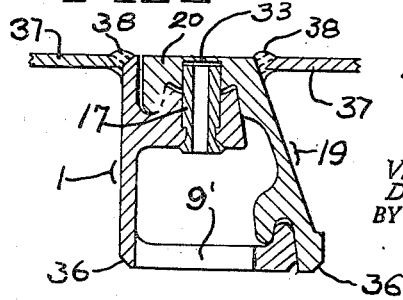
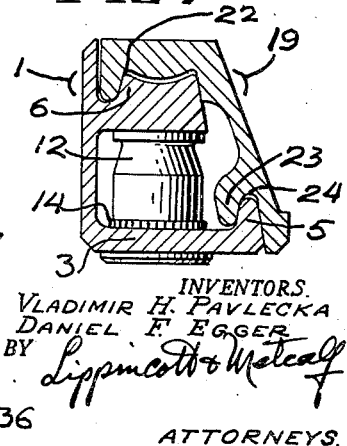
INVENTORS.
VLADIMIR H. PAVLECKA
DANIEL F. EGGER
BY Lippincott & Metcalf
ATTORNEYS.

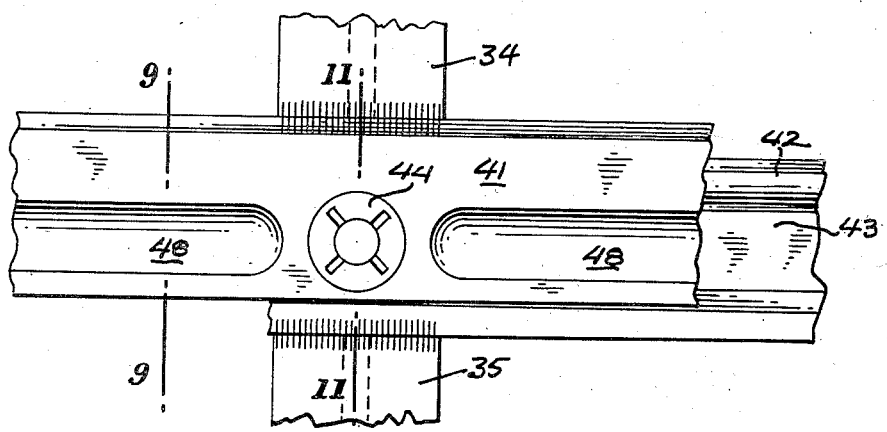
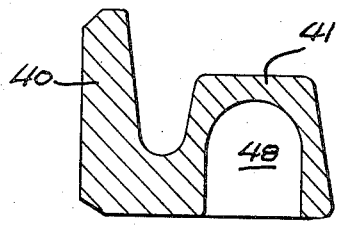
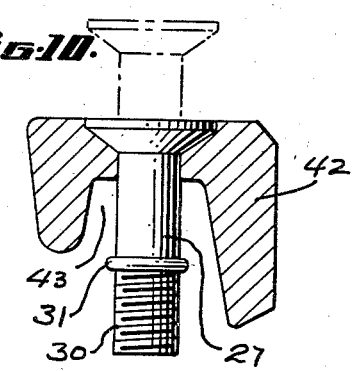
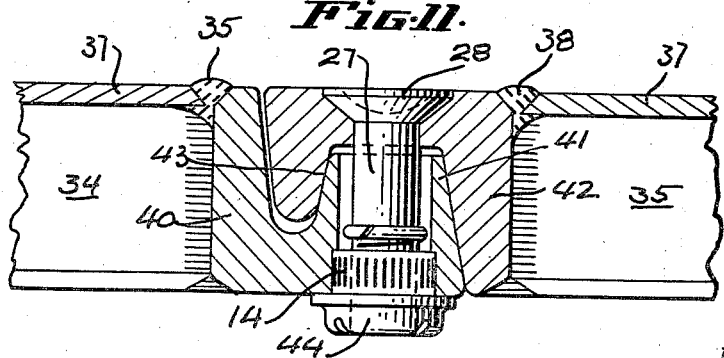

Patented Oct. 31, 1944

2,361,706

UNITED STATES PATENT OFFICE 2,361,706

STRUCTURAL JOINT

Vladimir H. Pavlecka, Pacific Palisades, and Daniel F. Egger, Inglewood, Calif., assignors to Northrop Aircraft, Inc., Hawthorne, Calif., a corporation of California Application August 4, 1941, Serial No. 405,318

7 Claims. (Cl. 189—36)

Our invention relates to structural points and more particularly to a structural joint which may be readily and easily separated and replaced, the parts being tied together in such a manner that when assembled the structure acts as a structural unit.

Among the objects of our invention are: to provide a structural joint that can be assembled to form a girder, and readily separated in order that parts attached to said girder may be quickly replaced; to provide a structural joint that is ideally adapted for use in airplane construction; to provide a separable girder structure; to provide a means by which structural parts may be separated along a girder line; and to provide a simple structural unit that is separable, and yet which when assembled will have a structural characteristic of a unitary girder or supporting member.

Other objects of our invention will be apparent or will be specifically pointed out in the description forming a part of this specification, but we do not limit ourselves to the embodiment of the invention herein described, as various forms may be adopted within the scope of the claims.

Referring to the drawings:

Fig. 1 is a top plan view of one form of our invention as assembled.

Fig. 2 is a sectional view taken as indicated by the line 2—2 in Fig. 1.

Fig. 3 is a cross-sectional view partly in elevation of one portion of the device shown in Figs. 1 and 2.

Fig. 4 is a cross-sectional view of the other portion of the device shown in Figs. 1 and 2.

Fig. 5 is a cross-sectional view of one member taken through a retaining pin.

Fig. 6 is a cross-sectional view taken as indicated by the line 6—6 in Fig. 1.

Fig. 7 is a cross-sectional view, partly in elevation, taken as indicated by the line 7—7 in Fig. 1.

Fig. 8 is a bottom plan view of a modification of our invention.

Fig. 9 is a cross-sectional view of one element of the device of Fig. 8 taken as indicated by the line 9—9 in Fig. 8.

Fig. 10 is a view partly in elevation and partly in section, of the other element and bolt of the girder shown in Fig. 8.

Fig. 11 is a sectional view through the assembled elements of the girder of Fig. 8, showing the attachment of the nut.

Our invention may be more fully understood by direct reference to the drawings and first to the embodiment shown in Figs. 1 to 7 inclusive, illustrating a separable box girder. A male element 1 of inverted F-shape is provided with a substantially planar lateral portion 2 and a substantially planar bottom portion or minor web 3 angularly attached to portion 2.

The element 1 may be of extruded aluminum or magnesium if desired. Minor web 3 terminates in a minor wedge ridge 5 extending along member 1 and a major wedge ridge 6 projects from side portion 2, and extends along member 1 parallel to wedge ridge 5. Wedge ridge 6, at regular intervals, is provided with bolt bores 9 extending parallel to side portion 2, and minor web 3 is provided with nut bores 9' coaxially positioned with respect to bores 9. Counterbores 10 are formed around bores 9 at the bottom surface of the major wedge ridge 6, to position nut shoulders 11 formed on hollow nuts 12, these nuts being inserted through bottom apertures 9', and held in position by spline serrations 14 on cylindrical surfaces of the nuts adjacent the lower ends thereof, the nuts terminating in end flanges 15. The serrations are press fitted into their surrounding apertures 9' so that the nuts are tightly gripped and cannot fall out. Furthermore, the serrations resist any twisting moments applied to the nuts.

Nuts 12 are preferably positioned in every other set of apertures 9 and 9' in the angle bar. The remaining openings 9' in the lower portion are left open. Coaxially positioned with respect to these remaining openings, positioning pins 17 are riveted into major wedge ridge 6, as shown in Fig. 5, with the upper ends of the pins projecting above the upper surface of major wedge ridge 6.

The other element 19 of the girder is formed in inverted L-shape, having an upper portion 20, and a side member 21 extending downwardly therefrom. The bottom surface of upper portion 20 is provided with a major female channel 22 extending along the element 19, and the inside of side wall 21 is provided with a projecting ridge 23 which forms, with the side wall, a minor female channel 24, both channels opening downwardly. Minor female channel 24 is shaped to receive minor wedge ridge 5 on member 1. Major female channel 22 is shaped to receive major wedge ridge 5 on member 1. Major female channel 22 is shaped to receive major wedge ridge 6, on element 1, so that when the two are placed together with registry of male and female parts, they will form, when locked, a box girder.

Bolt bores 9 are each provided with a countersink 26, and lock-bolts 27 are provided, each having a relatively flat head 28 fitting counterbore 26, with an end thread 30 engaging the interior threads of a nut 12. Bolts 27 are prevented from coming completely out of bores 9 by the use of a snap-ring 31 placed around each bolt just above the threads thereof. In order to securely lock each bolt in the cooperating nut, we prefer to utilize an elastic stop-nut construction where an elastic fibre insert 32 is positioned in each nut to be engaged by the end threads of bolts 27. Such nuts lock the bolts firmly when tightened, and the bolts can be easily released and the nuts reused when desired.

The lower surface of portion 20 of member 19 is also provided with retaining pin recesses 33 positioned between bores 9' to receive the upwardly extending ends of retaining pins 17 as shown in Fig. 6. These pins and recesses are accurately spaced, so that when the two elements of the structural joint are placed together with their wedge surfaces engaged, pins 17 can enter recesses 33, and properly space the elements for the insertion of bolts 27.

The use of regularly distributed locking bolts, forces the wedge ridges uniformly into the female channels, so that the elements become for all intents and purposes, when locked, a unitary girder with properly distributed stress resistance. It will be noted that both of the female channels 22 and 24 are deeper than the corresponding male wedges 5 and 6, so that any wear that might occur in mounting and demounting the girder will automatically be taken up in locking the elements. Side girders such as ribs 34 and 35 may be attached to the right and left members respectively of the box girder if desired, and units built thereon that can be quickly and easily replaced.

It will be noted that the joint we have just described is ideally adapted for use in airplane work, and we have therefore provided chamfered surfaces 36 at the corners of the girder at the proper angle to be used as one edge of a weld if desired. Sheets 37 are shown in Fig. 6 welded to the top of the girder element, by welds 38. It will also be noted that the girder on one face, i. e., the bolt-head face, presents a substantially flat surface to the atmosphere. When sheets 37 are placed on each side of this top surface and welded thereto, a substantially continuous surface is obtained, interrupted only by the slight crown of the bolt-head 28. If desired this bolt-head can be made entirely flat. Thus this surface may be utilized on the outside of a surface subject to an airflow, such as, for example, on an airplane wing or body. A section of such wing or body may be entirely removed or replaced from the outside only thereof, by placing the girder construction, just described, all around the parts to be made removable.

In Figs. 8 to 11 inclusive, we have shown a modification of our invention which, when assembled, will form a solid girder rather than a box girder. In this case the male element 40 is provided with a lateral wedge ridge 41. The female member 42 is of inverted L-shape, and is provided with a female channel 43 along the under portion thereof. In this case short nuts 44 are pressed in place in apertures in wedge ridge 41, these nuts being splined as nuts 12 are splined. Bolts 27 are then used to unify the girder.

In this modification the surface sheets 37 can be welded to the top of the girder, as indicated by welds 38. In order that the girder may be made light, yet strong where the locking strains are applied adjacent each bolt and nut, we may prefer to remove metal along lower channels 48 of element 40 between nuts 44 or between nuts and retaining pins 17 if used, as obviously the same retaining-pin structure as used in the previously described modification can be used between every bolt and nut assembly of the present modification.

Thus we have provided an easily separable structural joint which may be in the form of a box girder or a solid beam and which is ideally adapted for light construction such as, for example, in the building of airplanes and similar devices where parts easily and quickly separable from one another are desired without loss of strength in the assembled structural unit. Other girder shapes can of course be joined as above described.

We claim:

1. A separable structural joint comprising an extended male member, having a minor web projecting laterally from one edge of said male member and terminating in a minor wedge ridge, a major wedge ridge projecting from said male member, both of said ridges being parallel with the extent of said male member, and a female member having a minor wedge channel fitting said minor wedge ridge and a major wedge channel fitting said major wedge ridge, the top of said major wedge channel and the bottom of said web extending to close the box girder formed when said members are fitted together, and means simultaneously engaging the top of said major wedge channel, said major wedge ridge and said minor web for locking said ridges into said channels.

2. A separable structural joint comprising an extended male member, having a minor web projecting laterally from one edge of said male member and terminating in a minor wedge ridge, a major wedge ridge projecting from said male member, both of said ridges being parallel with the extent of said male member, and a female member having a minor wedge channel fitting said minor wedge ridge and a major wedge channel fitting said major wedge ridge, and means simultaneously engaging the top of said major wedge channel, said major wedge ridge and said minor web for locking said ridges into said channels.

3. Apparatus in accordance with claim 1 wherein said latter means comprise a nut fastened to said web on the male member, and a bolt passing through said major wedge channel on the female member and entering said nut.

4. Apparatus in accordance with claim 1 wherein said latter means comprise a nut fastened to said web on the male member, and positioned by registry with a bolt aperture in said major wedge ridge, and a bolt passing through said major wedge channel on the female member and entering said nut.

5. Apparatus in accordance with claim 1 wherein said latter means comprise a nut fastened to said web on the male member, and positioned by registry with a bolt aperture in said major wedge ridge, a bolt passing through said major wedge channel on the female member and entering said nut, and a positioning pin mounted on said male major wedge ridge and projecting to enter a recess in said female major wedge channel, said pin being spaced from said bolt.

6. Apparatus in accordance with claim 1 wherein said latter means comprise a nut fastened to said web on the male member, and positioned by registry with a bolt aperture in said major wedge ridge, a bolt passing through said major wedge channel on the female member and entering said nut, and a positioning pin mounted on said male major wedge ridge and projecting to enter a recess in said female major wedge channel, said pin being spaced from said bolt, said members being provided with alternately positioned pins and bolts along the extent thereof.

7. A separable structural joint comprising an extended male member, having a minor web projecting laterally from one edge of said male member and terminating in a minor wedge ridge, a major wedge ridge projecting from said male member, both of said ridges being parallel with the extent of said male member, and a female member having a minor wedge channel fitting said minor wedge ridge and a major wedge channel fitting said major wedge ridge, the top of said major wedge channel and the bottom of said web extending to close the box girder formed when said members are fitted together, a nut bridging and engaging said minor web and said major wedge ridge, and a bolt having a head engaging the top of said major web channel threaded in said nut for locking said ridges into said channels.

VLADIMIR H. PAVLECKA.
DANIEL F. EGGER.